(12) United States Patent
Friedman et al.

(10) Patent No.: US 6,726,979 B2
(45) Date of Patent: Apr. 27, 2004

(54) PROTECTIVE GLAZING LAMINATE

(75) Inventors: Michael L. Friedman, Wayne, NJ (US); Glenn T. Visscher, Morris Plains, NJ (US)

(73) Assignee: Saint-Gobain Performance Plastics Corporation, Wayne, NJ (US)

( * ) Notice: Subject to any disclaimer, the term of this patent is extended or adjusted under 35 U.S.C. 154(b) by 66 days.

(21) Appl. No.: 10/083,437

(22) Filed: Feb. 26, 2002

(65) Prior Publication Data

US 2003/0162028 A1 Aug. 28, 2003

(51) Int. Cl.[7] .................... B32B 17/10; B32B 27/08; B32B 27/30; B32B 27/40; B32B 33/00
(52) U.S. Cl. .................. 428/141; 428/142; 428/332; 428/412; 428/421; 428/422; 428/423.1; 428/426; 428/920
(58) Field of Search ................ 428/141, 142, 428/332, 412, 421, 422, 423.1, 426, 920

(56) References Cited

U.S. PATENT DOCUMENTS 5,061,333 A * 10/1991 Ishikawa et al. ............ 156/213
5,908,704 A * 6/1999 Friedman et al. ........... 428/426

* cited by examiner

*Primary Examiner*—Ramsey Zacharia
(74) *Attorney, Agent, or Firm*—Jeffrey C. Lew; Mike Crosby (57) ABSTRACT

Disclosed is a fire-protection and safety glazing laminate having a haze value less than 4 percent comprising (A) a plurality of high modulus layers laminated with (B) at least one fluoropolymer resin layer wherein (B) resides between (A). The high modulus layers comprise glass, polycarbonate or polyurethane. The fluoropolymer resin layer has a matte finish surface, an embossed finish surface or a combination thereof and is exposed to a corona treatment in an organic gas atmosphere. The high modulus layers are adhered to the fluoropolymer resin layer through a pressure and heat lamination.

12 Claims, 1 Drawing Sheet

PROTECTIVE GLAZING LAMINATE

FIELD OF THE INVENTION

The present invention relates to a fire protection and safety glazing laminate including high modulus layers and fluoropolymer resin layers wherein the fluoropolymer resin layer resides between the high modulus layers. The fluoropolymer resin layer is surface treated and corona treated in an organic gas atmosphere such that the fluoropolymer resin layer adheres to the high modulus layers without benefit of adhesive or other tie layers.

BACKGROUND OF THE INVENTION

Protective glazing laminates are used in many interior and exterior building applications. Protective laminates are usually constructed with at least one polymeric interlayer film sandwiched between at least two structural supports made of mineral or polymer glass or polymeric substrates. Currently a variety of materials are used for different applications. Those interlayer materials may include polyvinyl butyral (PVB), ethylene vinyl acetate copolymers (EVA), polycarbonate (PC), ionomeric resins, metallocene polyethylene m-LLDPE and/or fluoropolymers. The films are usually laminated to the substrate through heat and pressure. In addition, many materials require an adhesion primer, either incorporated into the film formulation as an additive or coated on the surface substrates. In many cases the films are also given a raised pattern on their surface to improve lamination through a better air removal process, prior to bonding the polymer layer to the substrate.

In applications where fire resistance is a requirement, it is necessary to choose an interlayer material that will retain its structure at high temperatures and not degrade to potentially harmful fumes when burned. Another function of the adhesive interlayer is to prevent the structure from losing glass debris, after the laminate has been exposed to the high heat of fire. Very few materials, besides fluoropolymers, will be able to meet this criteria. Due to its highly electronegative structure and its high surface energy, fluoropolymers do not bond well to other materials. When using fluoropolymers it is necessary to use an effective priming step to increase the bondability of the material to the glass substrate. The priming step can tend to be messy, time consuming and may decrease the fire resistance of the interlayer materials, due to the organic nature of most of the primers.

Surface (corona) treatment of materials is a common method to improve adhesion to typical substrates. In the case of fluoropolymer resin layers, however, the treatment will only last in the range of minutes to hours. Corona treatment using an organic atmosphere, hereinafter, C-Treatment (where the C refers to the Cementability of the film after treatment), has been proven to give superior adhesion to substrates that will last an extended time, on the order of months to years. The C-Treatment of fluoropolymer resin layers will enhance their adhesion to glass, however, the adhesion may not be not strong enough to pass the rigorous impact tests specified by the building industry for safety and fire protective glazing.

U.S. Pat. No. 5,230,954 (Sakamoto et al., Jul. 27, 1993) relates to a fire protective glass panel for use in a fire protective window, door and partition wall, which comprises at least one sheet of fireproof glass plate and a fluorocarbon resin film of a chain molecular structure type bonded to a side surface of the glass plate and which has non-shattering property as well as fire protection property wherein the fireproof glass plate is a heat-resistant and light transparent crystallized glass plate or, alternatively, the fireproof glass plate is a wire glass plate and the fluorocarbon resin film has a thickness of 0.02–1 mm and is made of one of FEP, PFA, PCTFE, ETFE and PVDF U.S. Pat. No. 5,529,655 (Bravet et al., Jun. 25, 1996) relates to a laminated safety pane, comprising a monolithic or laminated substrate of glass and/or of plastics material and a sheet of plastics material comprising at least one external polyurethane film providing desirable surface properties. According to the reference, the pane is provided, on at least one zone of the polyurethane film, with a gluing prefilm compatible with a film of adhesive deposited later, this prefilm being deposited after an electrical treatment applied to at least the zone of the polyurethane film which is to receive the prefilm, this electrical treatment being chosen from among the treatments of the corona discharge type.

U.S. Pat. No. 5,624,761 (Sakamoto et al., Apr. 29, 1997) is directed to a fire-protection and safety composite glass panel that includes a fireproof glass plate and a film of fluorocarbon resin of a chain molecular structure type. The film is bonded onto one of opposite side surfaces of the fireproof glass plate by the thermo-compression bonding. The fluorocarbon resin is a copolymer of at least three kinds of monomers. It may be arranged that another film of the fluorocarbon resin is further bonded onto the other side surface of the fireproof glass plate by the thermo-compression bonding. Another glass panel may be arranged that a plurality of fireproof glass plates are attached with a film of the foregoing fluorocarbon resin interposed between adjacent glass plates through the thermo-compression bonding. Those glass panels can be used as glass plates in fire protective windows and doors.

U.S. Pat. No. 5,908,704 (Friedman et al., Jun. 1, 1999) relates to optical and firescreening protective glazing laminates comprising fluoropolymer interlayer films. The films and their laminates comprise THV and blends of THV with FEP, ECTFE or ECCTFE and modified with additives, such as coupling agents, pigment or color concentrates, and IR- or UV-light blockers, and may be subjected to a surface corona treatment. The films also may incorporate a fiber mesh for additional reinforcement.

U.S. Pat. No. 5,972,176 (Kirk et al., Oct. 26, 1999) describes a process for corona treating a polymer. The process involves exposing at least one surface of an article comprising a polymeric material selected from the group consisting of fluoropolymers, polycarbonates, and polyimides to a corona discharge in an atmosphere containing nitrogen and about 0.01 to about 10 percent of an additional gas selected from the group consisting of hydrogen, ammonia and mixtures thereof.

U.S. Pat. No. 6,042,928 (Suzuki et al., Mar. 28, 2000) describes a fluorocarbon resin sheet having a fluorine content of at least 55 percent and a melting point of from 60 to 220° C., made solely of a polymer comprising at least one fluorine-containing monomer, or made of a blend of such a polymer with other polymer, which has a total light transmittance of at least 80% and a tensile modulus of elasticity within a range of from $1\times10^7$ to $4\times10^9$ Pa within an entire measuring temperature range of from 0 to 30° C., wherein the surface of the resin sheet is embossed to have a center line average roughness Ra of from 0.05 to 2.0 μm and a number of peaks Pc of from 5 to 500 peaks/8 mm.

In many of the references discussed above, a separate adhesive layer is necessary for adhesion of the interlayer to the glass substrates. Often this layer must be specially made or treated to reduce its flammability in fire resistant glazing. It is the object of this invention to show that a combination of surface patterning (either raised line or random matte pattern) and a C-Treatment of a fluoropolymer resin layer or layers in an organic gas environment, will serve to significantly improve the adhesion of the fluoropolymer resin layer or layers to high modulus layers without the need for priming of their surface or addition of a flammable adhesive layer.

SUMMARY OF THE INVENTION

Disclosed is a fire-protection and safety glazing laminate having a haze value less than 4 percent comprising (A) a plurality of high modulus layers laminated with
(B) at least one fluoropolymer resin layer
wherein (B) resides between (A),
wherein the high modulus layers comprise glass, polycarbonate or polyurethane,
wherein the fluoropolymer resin layer has a matte finish surface, an embossed finish surface or a combination thereof,
wherein the fluoropolymer resin layer is exposed to a corona treatment in an organic gas atmosphere and
wherein the high modulus layers are adhered to the fluoropolymer resin layer through a pressure and heat lamination.

DETAILED DESCRIPTION OF THE INVENTION

It is the object of this invention to show that a combination of surface patterning (either raised line or random matte pattern) and a C-treatment in an organic gas atmosphere of a fluoropolymer resin layer or layers, will serve to improve the adhesion of the fluoropolymer resin layer or layers to high modulus layers without the need for any preliminary priming.

(A) The High Modulus Layers

Serving as high modulus layers are materials that comprise glass, polycarbonate or polyurethane, as well as combinations of at least two different layers. By the term "high modulus" it is meant the glass, polycarbonate or polyurethane layers have a flexibility that is normally measured by their modulus value, that is, the load in pounds per square inch of initial cross-sectional area necessary to cause (A) to give, stretch, bend or deform after (A) has fully cured. That is, "high modulus" is a term that describes the physical characteristic of (A) after it has cured. The term modulus applies to solids. The high modulus layers (A) of this invention have a modulus, which is, in general, in the range of at least $1\times10^5$ pounds per square inch to $2\times10^5$ pounds per square inch.

Figure 1:
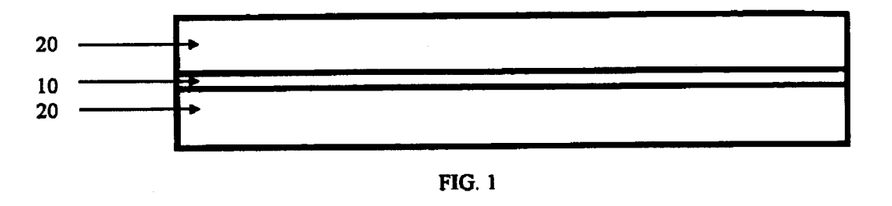
FIG. 1 is a cross-sectional view of one embodiment of the invention.
Figure 2:
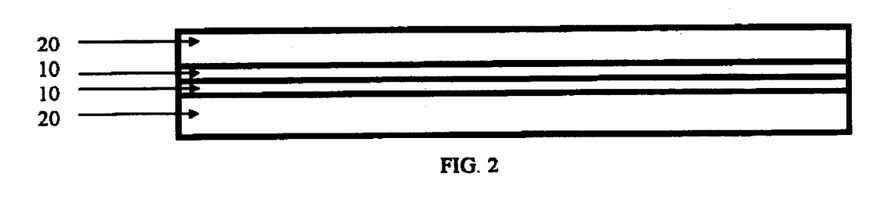
FIG. 2 is a cross-sectional view of an alternative embodiment of the invention.
Figure 3:
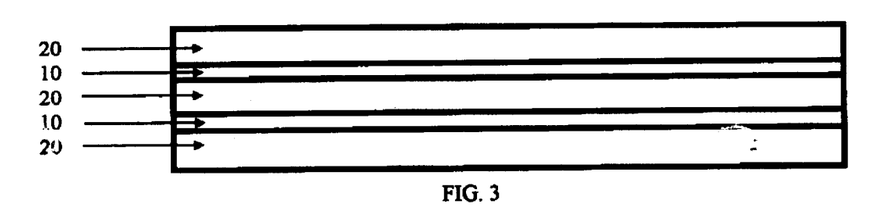
FIG. 3 is a cross-sectional view of an additional alternative embodiment of the invention.

Referring now to the drawings, wherein the showings are for purposes of illustrating the preferred and alternate embodiments of the invention only and not for purposes of limiting the same, FIG. 1 shows the protective glazing laminate of the present invention wherein a fluoropolymer resin layer 10, which is component (B), resides between two high modulus layers 20, which is component (A). This laminate, denoted as an A-B-A structure, is typical of a configuration in which the laminate possesses (n) (A) layers and (n-1) (B) layers. FIG. 2 shows the protective glazing laminate of the present invention wherein two layers of the fluoropolymer resin layer 10, component (B), are adjacent to each other and the two layers of the fluoropolymer resin layer 10 reside between two high modulus layers 20, component (A). This laminate, denoted as an A-B-B-A structure, is typical of a configuration in which the laminate possesses (n) (A) layers and (n) (B) layers. FIG. 3 shows two layers of the fluoropolymer resin layer 10, component (B), not adjacent to each other and that each layer 10 resides between two high modulus layers 20, component (A). This laminate, denoted as an A-B-A-B-A structure, is typical of a configuration in which the laminate possesses (n) (A) layers and (n-1) (B) layers.

When mineral glass is the high modulus layer, the glass is a silicate glass and is formed by the float glass method, which is the only industrial method in use today. In this method, the molten glass is poured from a discharge or transfer unit of a melting furnace so that it can fall freely onto a molten metal bath which to date has always been tin since it is necessary for the bath to be molten throughout a temperature range of 1000° F. to 2000° F. as well as having a specific gravity that is greater than glass and, to date, tin is the only material that satisfies such requirements. The molten glass then spreads out backwards as well as laterally and forwards, the backward stream returning subsequently on the sides. This process has the advantage of systematically eliminating the glass that may have become contaminated by contact with the discharge or transfer unit which is made of refractory material. By this process, the smoothness of the product is remarkably improved as compared with the previous roll out process or the like, whereby a polishing step which used to be required, is no longer necessary.

Polycarbonates for use as high modulus organic glass layers are high molecular weight, thermoplastic, aromatic polymers and include homopolycarbonates, copolycarbonates and copolyestercarbonates and mixtures thereof which have average molecular weights of about 8,000 to more than 200,000, preferably of about 20,000 to 80,000 and an intrinsic viscosity of 0.40 to 1.0 dl/g as measured in methylene chloride at 25° C. In one embodiment, the polycarbonates are derived from dihydric phenols and carbonate precursors and generally contain recurring structural units of the formula:

where Y is a divalent aromatic radical of the dihydric phenol employed in the polycarbonate producing reaction.

Suitable dihydric phenols for producing polycarbonates include the dihydric phenols such as, for example, 2,2-bis(4-hydroxyphenyl)propane, bis(4-hydroxyphenyl)-methane, 2,2-bis(4-hydroxy-3-methylphenyl)propane, 4,4-bis(4-hydroxyphenyl)heptane, 2,2-(3,5,3',5'-tetrachloro-4,4'-dihydroxyphenyl)propane, 2,2-(3,5,3',5'-tetrabromo-4,4')-propane, and 3,3'-di-chloro-4,4-dihydroxydiphenyl)methane. Other dihydric phenols which are also suitable for use in the preparation of the above polycarbonates are disclosed in U.S. Pat. Nos. 2,999,835; 3,038,365; 3,334,154; and 4,131,575, incorporated herein by reference.

It is of course possible to employ two or more different dihydric phenols or a copolymer of a dihydric phenol with a glycol or with a hydroxy- or acid-terminated polyester, or with a dibasic acid in the event a carbonate copolymer or interpolymer rather than a homopolymer is desired for use in the preparation of the articles of the invention. Blends of any of the above materials can also be employed to provide the aromatic polycarbonate. In addition, branched polycarbonates such as are described in U.S. Pat. No. 4,001,184, can also be utilized in the practice of this invention, as can blends of a linear polycarbonate and a branched polycarbonate.

The carbonate precursor employed can be either a carbonyl halide, a carbonate ester or a haloformate. The carbonyl halides which can be employed are carbonyl bromide, carbonyl chloride and mixtures thereof Typical of the carbonate esters which can be employed are diphenyl carbonate, a di(halophenyl)carbonate such as di(chlorophenyl)carbonate, di(bromophenyl)carbonate, di(trichlorophenyl)carbonate, di(tribromophenyl)carbonate, etc., di(alkylphenyl)carbonate such as di(tolyl)carbonate, etc., di(naphthyl)carbonate, di(chloronaphthyl)carbonate, etc., or mixtures thereof. The suitable haloformates include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

The polycarbonate may also be a copolyestercarbonate as described by Clayton B. Quinn in U.S. Pat. No. 4,430,484 and the references cited therein, incorporated herein by reference. Preferred polyestercarbonates are those derived from the dihydric phenols and carbonate precursors described above and aromatic dicarboxylic acids or their relative derivatives, such as the acid dihalides, e.g., dichlorides. A quite useful class of aromatic polyestercarbonates are those derived from bisphenol A; terephthalic acid, isophthalic acid or a mixture thereof or their respective acid chlorides; and phosgene. If a mixture of terephthalic acid and isophthalic acid is employed, the weight ratio of terephthalic acid to isophthalic acid may be from about 5:95 to about 95:5. Another polycarbonate which may be used has from about 70 to about 95 weight percent ester content and a range of terephthalate groups of from 2 to about 15 weight percent of the total ester content. The remaining ester units are isophthalate units. These polycarbonates are more commonly known as polyphthalate carbonates and are described, for example, by Miller, et. al., U.S. Pat. No. 4,465,820, herein incorporated by reference in its entirety.

The polycarbonates used to form the present invention can be manufactured by known processes, such as, for example, by reacting a dihydric phenol with a carbonate precursor such as diphenyl carbonate or phosgene in accordance with the methods set forth in the above-cited literature and U.S. Pat. Nos. 4,018,750 and 4,123,436, or by transesterification processes such as are disclosed in U.S. Pat. No. 3,153,008 as well as other processes known to those skilled in the art.

The aromatic polycarbonates are typically prepared by employing a molecular weight regulator, an acid acceptor and a catalyst. The molecular weight regulators which can be employed include phenol, cyclohexanol, methanol, alkylated phenols, such as octylphenol, paratertiary-butylphenol, etc. Preferably, phenol or an alkylated phenol is employed as the molecular weight regulator.

The acid acceptor can be either an organic or an inorganic acid acceptor. A suitable organic acid acceptor is a tertiary amine and includes such materials as pyridine, triethyl amine, dimethylaniline, tributylamine, etc. The inorganic acid acceptor can be one which can be either a hydroxide, a carbonate, a bicarbonate, or a phosphate or an alkali or alkaline earth metal.

The catalyst which can be employed are those that typically aid the polymerization of the monomer with phosgene. Suitable catalysts include tertiary amines such as tri ethyl amine, tripropyl amine, N,N-dimethylaniline, quaternary ammonium bromide, cetyl triethyl ammonium bromide, tetra-n-heptyl ammonium iodide, tetra-n-propyl ammonium bromide, tetramethyl ammonium chloride, tetra-methyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also included are branched polycarbonates wherein a polyfunctional aromatic compound is reacted with the monomer and carbonate precursor to provide a thermoplastic randomly branched polycarbonate. The polyfunctional aromatic compounds contain at least three functional groups which are carboxyl, carboxylic anhydride, haloformyl, or mixtures thereof. Illustrative polyfunctional aromatic compounds which can be employed include trimellitic anhydride, trimellitic acid, trimellityl trichloride, 4-chloroformyl phthalic anhydride, pyromellitic acid, pyromellitic dianhydride, mellitic acid, mellitic anhydride, benzophenone-tetracarboxylic anhydride, and the like. The preferred polyfunctional aromatic compounds are trimellitic anhydride and trimellitic acid or their acid halide derivatives The polyurethanes as high modulus layers are prepared by reacting an organic polyisocyanate and an active hydrogen containing material. The materials must be substantially anhydrous to prevent loss of clarity due to the release of carbon dioxide from the reaction of water with isocyanate groups.

The selection of isocyanates and active hydrogen containing materials for preparing the transparent thermosetting polyurethane layer is limited by the physical properties which the layer must have.

It is necessary that the polyurethane layer has a Shore D hardness greater than about 70. When the polyurethane layer has a Shore D hardness greater than about 70, a laminate prepared from the sheet is rigid.

Polyisocyanates useful for preparing the polyurethane layer can be monomeric or polymeric, and can be aromatic or aliphatic. A blend of polyisocyanates can be used. Among the organic polyisocyanates that can be employed are the various organic compounds containing two or more isocyanate groups, or mixtures of such, including aromatic, aliphatic and cycloaliphatic diisocyanates and triisocyanates, and combinations thereof Representative compounds include 2,4-toluene diisocyanate, m-phenylene diisocyanate, 4-chloro-1,3-phenylene diisocyanate, 4,4'-diphenylene diisocyanate, 3,3'-dimethyl-4,4'-diphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexyl diisocyanate, 4,4'-methylene-bis (cyclohexyl isocyanate), 1,5-tetrahydronaphthylene diisocyanate, p-xylene diisocyanate, durene diisocyanate, and 1,2,4-benzene triisocyanate. The diisocyanates may contain other substituents which do not react with isocyanate groups. In the case of the aromatic compounds, the isocyanate groups may be attached either to the same or to different rings. Dimers of monomeric diisocyanates, and di(isocyanatoaryl) ureas such as di-(3-isocyanato-4-methyl-phenyl) ureas may be used.

Preferably, aliphatic and cycloaliphatic isocyanates are used to combat discoloration in sunlight. The preferred cycloaliphatic isocyanate is 4,4'-methylene-bis (cyclohexyl isocyanate) which exhibits excellent yellowing resistance, and when reacted with polyalkylene ether polyols, yields polyurethane layers with a high degree of clarity, as described below. This material, 4,4'-methylene-bis (cyclohexyl isocyanate), is available from E. I. du Pont de Nemours and Company of Wilmington, Del., under the tradename "Hylene W" in a formulation which has an isomeric content of about 50% trans isomer and about 50% cis isomer.

The active hydrogen containing material used for preparing the polyurethane layer can be monomeric or polymeric.

The presence or absence of active hydrogen atoms is determined by the Zerewitinoff test which is described by Kohler in volume 49 of the Journal of the American Chemical Society, page 3181 (1927). According to this test, active hydrogen atoms are generally found in monomeric and polymeric materials having one or more of the following groups: OH, COOH, $NH_2$, and NRH where R is any organic radical. The preferred materials containing an active hydrogen atom are those with an OH group, and especially polyalkylene ether polyols, which yield products with good hydrolytic stability. The term "polyalkylene ether polyols" refers to compounds which result from the reaction of an alkylene oxide and a compound having at least two active hydrogen atoms. The polyalkylene ether polyols have a molecular weight from about 100 to about 2000, and preferably from about 300 to about 1500.

Only thermosetting cross-linked polyurethane layers have high resistance to chemical attack, high toughness and impact strength, high rigidity, and high resistance to the effects of weathering, including ultraviolet light, rain, ice, and sand. Therefore, at least some compounds containing at least three active hydrogen atoms are reacted with the alkylene oxide to produce a thermosetting polyurethane layers.

Compounds having at least three active hydrogen atoms which may be employed in the preparation of the polyalkylene ether polyols include aliphatic alcohols such as glycerol, trimethylolpropane, pentaerythritol, sorbitol and sucrose; organic acids such as aconitic, trimellitic and hemimellitic; inorganic acids such as the phosphoric acids; amines such as ethylene diamine, propylene diamine, diethylene triamine, and triisopropanolamine; phenolic compounds such as pyrogallol, dihydroxybenzoic acid, hydroxyphthalic acids and inositol mercaptans such as 1,2,3-propane trithiol and amides such as benzene disulfonamide. Mixtures of any of the above compounds may also be employed. The particular compound which is employed is not critical since it constitutes only a small proportion of the weight of the polyol. All that is important is that the compound have at least three active hydrogen atoms.

The polyalkylene ether polyols are prepared by standard art procedures such as catalytic polymerization of the oxide and the compound having at least three active hydrogen atoms. An alkaline catalyst such as potassium hydroxide is often employed in this polymerization.

Polyols having four, five and even up to ten hydroxyl groups per molecule are operative. However, as the number of hydroxyl groups increases, the rigidity of the product increases, which makes it more difficult to bend the polycarbonate/polyurethane laminate. Therefore it is preferred that compounds containing no more than four groups be used in preparing the polyalkylene ether polyols.

For improved hydrolytic stability, it is preferred that saturated aliphatic polyalkylene ether polyols can be used for preparing the polyurethanes of this invention. Thus the preferred alkylene oxides used in preparation of the polyalkylene ether polyols include methylene oxide, ethylene oxide, propylene oxide, isopropylene oxide, and butylene oxide, and the like.

The choice of polyalkylene ether polyols affects the physical properties of the polyurethane layer. As the polyol molecular weight decreases, the rigidity of the polyurethane layer increases.

A blend of polyalkylene ether polyols can be used in preparing the polyurethane layers. The appropriate molecular weight chosen for each polyol used in a blend depends upon molecular weight and functionality of the other polyols present. As the average, functionality of the polyols increases, the molecular weight also must increase to compensate for the increased rigidity resulting from the high number of cross links. For example, when only a triol is used, satisfactory polyurethane layers are produced with the average molecular weight of the triol at about 450. When only a tetrol is used, the preferred molecular weight of the tetrol is about 600.

The number of carbon atoms in the alkylene oxides used in preparation of the polyalkylene ether polyols also affects the physical properties of the polyurethane layers. As the number of carbon atoms increases, the resulting product becomes more flexible and less rigid. Therefore, when a polyalkylene ether polyol is prepared from alkylene oxides such as pentylene oxide, polyols of higher functionality, or of lower average molecular weight, or both, are used to increase the rigidity of the polyurethane layers. Therefore the selection and proportions of the polyalkylene ether polyols used in preparing the polyurethane layer requires balancing the functionality, the molecular weight, and the number of carbon atoms in the alkylene oxides used to make the polyol.

Although the polyurethane layers preferably are prepared from polyalkylene ether polyols, other materials or mixtures of these materials with polyalkylene ether polyols may be used. These other materials include polyalkylene arylene ether polyols, polyalkylene ether thioether polyols, polyester polyols, polyamines, polyesters, polyester amides, polyacetals, and the like.

The ratio of isocyanates to active hydrogen groups is from about 0.95 to about 1.10, and preferably about 1.05. An excess of isocyanates is used to form allophanate bonds, and thereby increase the tensile strength of the polyurethane layer.

To speed up the reaction of the isocyanate with the compound having an active hydrogen group, a catalyst may be used. Suitable urethane forming catalysts are those highly specific for the formation of polyurethane by reaction of —NCO and —OH groups and which have little tendency to accelerate side reactions. Catalysts such as stannous salts of organic acids and organotin compounds are preferred. Illustrative catalysts include stannous octoate, stannous oleate, dibutyltin diacetate, and dibutyltin dilaurate, the last name being especially preferred. The amount of catalyst to be used in a particular system can routinely be determined by one skilled in the art. The preferred catalyst, dibutyltin dilaurate, is usually employed in amounts of about 0.0005 to about 0.1 part per 100 parts of the polymer forming ingredients. The amount of catalyst needed depends on the curing temperature. While the stannous and organotin catalysts are preferred, other catalysts can be used.

Of the three high modulus layers of glass, polycarbonate and polyurethane, the preferred high modulus layer is glass. The high modulus layers are from 50, preferably from 75 and most preferably from 100 to 250 mils thick.

(B) The Fluoropolymer Resin Layer

Fluoropolymer resin layers having utility as Component (B) are derived from resins that comprise fluorinated copolymer of ethylene and propylene (FEP), fluorinated copolymer of tetrafluoroethylene and perfluoropropylvinyl ether (PFA), copolymer of ethylene and tetrafluoroethylene (ETFE), copolymer of ethylene and chlorotrifluoroethylene (ECTFE), polychlorotrifluoroethylene polymer (PCTFE), polyvinylidine fluoropolymer (PVDF), terpolymer containing segments of tetrafluoroethylene (TFE), hexafluoropropylene (HFP) and vinylidene fluoride (VDF), as well as blends and alloys thereof, or blends or alloys thereof. The TFE, HFP, VDF terpolymers are sold under the designation "THV" and are available from Dyneon Corp., Oakdale, Minn. The ECTFE polymer is available from Ausimont Corporation (Italy) under the trade name Halar. Other fluoropolymers used herein may be obtained from Daikin (Japan), DuPont (USA) and Hoechst (Germany). A preferred fluoropolymer is THV.

In one embodiment, the fluoropolymer resin layer comprises at least one of FEP, PFA, ETFE, ECTFE, PCTFE, PVdF, THV, blends and alloys or blends or alloys thereof. In another embodiment, the fluoropolymer resin layer comprises at least two of FEP, PFA, ETFE, ECTFE, PCTFE, PVdF, THV, blends and alloys or blends or alloys thereof.

Both sides of the component (B) surface have a surface treatment. This surface treatment comprises a matte finish, an embossed finish or a combination thereof. Regardless of the finish, the surface treatment is viewed as many separated projections as crests in the same level.

The configuration of the projections is not critical and is preferably cone, pyramid, diamond or prismatoid (which can have a round top or a flat top). Preferably the pyramids are trigonal pyramid, tetragonal pyramid, etc., and cone or flat top pyramids such as flat top trigonal or tetragonal pyramid and flat top cone. The tetragonal pyramid or flat top tetragonal pyramid is an optimum configuration.

The configurations of pyramids on one surface are not limited to the same configuration and can be mixed different configurations of trigonal pyramid (or flat tops pyramid), tetragonal pyramid (or flat top pyramid) or cone (or flat top cone). The size of the projections having the form of the cone, pyramid or flat top cone or pyramid is depending upon the usage of the interlayer, the temperature and time for bonding, etc. and is preferably in a range of 10 to 500 $\mu$m especially 15 to 360 $\mu$m in height. In the case of the tetragonal pyramid or the flat top tetragonal pyramid, a width of the bottom is preferably in a range of 100 to 850 $\mu$m, especially 140 to 450 $\mu$m. A diameter of the bottom of the cone can be easily considered from the width of the tetragonal pyramid. A width of the flat top surface can be selected as desired depending upon the condition of the processing.

Many projections on the surface of the fluoropolymer resin layer may have a different size but preferably have the same size. When many projections have different size, it is preferable to have similar distribution (at random) of sizes of the projections. The distribution of the projections can be regular or irregular and is preferably orthogonal matrix (lattice) arrangement so as to connect roots in a lattice form. A width of the root as a gap between bottoms of adjacent projections is allowed and is preferably smaller than the width of the bottom of the projection, especially ⅓ or less of the width of the bottom of the projection. In the optimum embodiment of the interlayer of the present invention, many regular tetragonal pyramid projections or regular tetragonal pyramid projections having each flat top are formed to give orthogonal roots (lattice).

The process for producing the fluoropolymer resin layer having the novel surface structure is not critical and chosen from, but not limited to, techniques known in the art by professionals including a calender roll process, an embossing roll process, a press embossing process, an irregular extruding process, a powder blasting process, a chemical etching process, a mechanical etching process, a draw-shaping process. The fluoropolymer resin layer produced by the calender roll process, the embossing roll process, the press embossing process or the irregular extruding process is especially preferable in view of fabricatability and properties of the fluoropolymer resin layer.

While not wishing to be bound by theory, it is believed that surface treatment of the fluoropolymer resin layer increases the surface area of the layer. With an increase in surface area, the layer is then C-treated. Because of the increase in surface area, more oxygen radicals are generated by C-treatment than otherwise would by generated on a layer that is not surface treated (having a smaller surface area).

For C-treatment, the surface treated fluoropolymer resin layers are stripped of any release liner and then exposed to a corona discharge in an organic gas atmosphere, wherein the organic gas atmosphere comprises acteone or an alcohol of four carbon atoms or less. Acetone is the preferred organic gas. The organic gas is admixed with an inert gas and the preferred inert gas is nitrogen. The acetone/nitrogen atmosphere causes an increase of adhesion of the fluoropolymer resin layer to the high modulus layer. The fluoropolymer resin layer is stripped of the release liner and then exposed to a corona discharge in an acetone/nitrogen atmosphere to increase adhesion of the fluoropolymer resin layer to the high modulus layers.

All details concerning the corona discharge treatment procedure are provided in a series of U.S. Patents assigned to E. I. du Pont de Nemours and Company, USA. An example of the proposed technique may be found in U.S. Pat. No. 3,676,181 (Kowalski) The atmosphere for the enclosed treatment equipment is a 20% acetone (by volume) in nitrogen and is continuous. The constantly fed (B) layer is subjected to between 0.15 and 2.5 Watt hrs per square foot of the film/sheet surface. The (B) layers are bi-side treated to increase the adhesion. The (B) layers are then placed back on a non-siliconized release liner for storage. (B) layers that are C-treated last more than 1 year without significant loss of surface wettability, cementability and adhesion.

Extrusion lines for the manufacturing of the fluoropolymer resin layer can be equipped with flat extrusion dies and casting rolls or drums used to take off and calibrate the thickness and to cool the fluoropolymer layer web. After cooling, the fluoropolymer resin layer may be wound into rolls. The thickness and the width of this layer will depend on the particular application, and can vary in the range from about 125 mcm (5 mil) to 1000 mcm (40 mil) for the thickness.

The fluoropolymer resin layer according to the present invention can be laminated to mineral and organic glasses and polymer substrates using the same technologies and conditions being used for conventional PVB safety glass interlayer films. Good quality mineral glass laminates can be manufactured in autoclaves at temperatures in the range from 140° C. to 170° C. and pressure in the range of 12 bar to 23 bar. The most frequently used autoclave lamination conditions are: temperature in the range from 150° C. to 165° C. and pressure in the range from 13 bar to 17 bar.

The following describes the preparation of the fluoropolymer resin layer (B) using THV as the starting resin. The THV pellets are pre-dried at 75–80° C. in a hot air, convection oven or a hot air drying unit (Conaire). The fluoropolymer resin layer can be extruded by one of three different extrusion processes.

In extrusion process #1, the fluoropolymer pellets are processed into layers using a cast film line consisting of a single screw extruder made by Extrusion Systems Limited (ESL). The screw of the ESL extruder has a diameter of 32 mm and a relative screw length of 24 diameters. The extruder is equipped with a flat extrusion die manufactured by Extrusion Dies, Inc. (EDI) and has an orifice which is approximately 32 cm (13 inches) wide. The THV-220G pellets are extruded to layers at 0.6096 mm (24 mil) thickness. The barrel of the single screw film extruder is divided into four heating zones, progressively increasing the temperature of the polymer material up to the adapter, filter, and the flat die. When extruding the THV-220G pellets to layers, the barrel temperature is maintained in each of the zones 1–4 in the range 100–110° C., 140–155° C., 165–180° C. and 180–190° C. respectively. The temperature of the adapter is maintained approximately at 190–195° C. The temperature of the die is maintained approximately at 190–200° C. in the middle sections, at 190–200° C. at both edges of the die, and at 195–205° C. at the lips of the die.

In extrusion process #2, the polymer pellets are processed into layers using a cast film line based on a single screw extruder made by Egan-Davis-Standard, a Crompton Corporation. The screw of the Egan-Davis-Standard extruder has a diameter of 51 mm and a relative screw length of 24 diameters. The extruder is equipped with a flat extrusion die having an orifice which is approximately 140 cm (55 inches) wide. The THV-220G pellets are extruded to layers at 0.6096 mm (24 mil) thickness. The barrel of the single screw film extruder is divided into four heating zones, progressively increasing the temperature of the polymer material up to the adapter, filter, and the flat die. The barrel temperature is maintained in each of the zones 1–4 in the range 110–125° C., 155–170° C., 180–200° C. and 190–210° C. respectively. The temperature of the adapter is maintained approximately at 195–205° C. The temperature of the die is maintained approximately at 190–200° C. in the middle sections, at 195–205° C. at both edges of the die, and at 195–200° C. at the lips of the die.

In extrusion process #3, the fluoropolymer pellets are processed into layers using a cast film line based on a single screw extruder made by Egan-Davis-Standard. The screw of the Egan-Davis-Standard extruder has a diameter of 50.8 mm and a relative screw length of 24 diameters. The extruder is equipped with a flat extrusion die having an orifice which is approximately 81.2 cm (32 inches) wide (EDI Corp.). The THV-220G pellets are extruded to layers at 0.6096 mm (24 mil) thickness. The barrel of the single screw film extruder is divided into four heating zones, progressively increasing the temperature of the polymer material up to the adapter, filter, and the flat die. The barrel temperature is maintained in each of the zones 1–4 in the range 198–200° C., 225–227° C., 226–228° C. and 228–230° C. respectively. The temperature of the adapter is maintained approximately at 232° C. The temperature of the die is maintained approximately at 218° C. in the middle sections, at 229° C. at both edges of the die, and at 241° C. at the lips of the die.

The temperatures are varied in each zone in a relatively narrow range according to the melt flow rate of the resin used. The speed of the screw is maintained at approximately 25.0 rpm for all (B) layers. (B) layers by Extrusion process #1 and #2 are extruded and cooled using a 3 roll casting roll stock and is wound onto 7.6 cm cores. Films by extrusion process #3 are extruded and cooled using a single casting drum and wound onto 15.2 cm cores.

The (B) layers are embossed by passing the layers through an Infrared oven, 36 inches long and equipped with 18 bulbs (Philips). The layers reside for approximately 8.6 seconds in the oven. The embossing pattern is imparted onto the softened layer by compression between a patterned steel roll and a rubber nip roll. The layer is placed on a non-siliconized release liner and collected onto a roll for further treatment.

Lamination of the Fluoropolymer Resin Layer Between Glass Panes or Sheets

A number of glass laminate samples are prepared as described in the following examples. All samples are produced using clear soda-lime-silicate glass sheets of 3 mm thickness and dimensions of 7.5×7.5 cm which are preliminarily cleaned using isopropyl alcohol to remove dust, grease and other contaminates from the glass surface.

For lamination, a piece of (B) layer is cut to obtain a sample that is 7.5×7.5 cm. This layer sample is placed between two cleaned glass plates and then the entire sandwich is placed in a standard hot air Autoclave, manufactured by United McGill Corporation. (Columbus, Ohio), equipped with a temperature-pressure-time control system monitored by a microprocessor. A program of heat (up to 140° C.) and pressure (up to 13 bar) is used to simulated autoclave conditions typical of optical laminate manufacture in the industry. The heating melts the (B) layer surfaces during the lamination process, helping to adhere the polymer layer to the glass substrate.

Testing of Laminates

The testing of laminates follows typical testing procedures as found in ANSI/SAE Z26.1; ANSI Z97.1 United Nations Agreement E/ECE/324, Addendum 42, Regulation 43; and other protocols used in evaluation of Architectural and Automotive safety glass.

Boiling Test

Laminated samples are vertically immersed in Room Temperature water (approx. 25° C.) for 3 to 5 minutes. The samples are then vertically immersed in boiling water (100° C.) for two (2) hours. The samples are then removed, cooled and inspected for any delamination or bubbling of the film from the high modulus layer (glass).

Pummel Test

Laminated samples are refrigerated for about 2–8 hours at a temperature of approximately −18° C. ±5 C °. After refrigeration, the samples were removed and immediately placed on a flat surface and tilted at an angle of approximately 45°. The tilted samples are repeatedly struck with a flat faced hammer until the silicate glass layer (high modulus) was pulverized. The adhesion is judged according to a 0–10 scale, where Pummel Value 0=100% of the film surface exposed to the air and Pummel Value 10=0% of the film surface exposed to air.

Haze Test

Laminated samples are cleaned using isopropyl alcohol and placed in a Hazemeter (BYK Gardner) and analyzed for haze, transparency and clarity.

EXAMPLE 1

This is a comparative example in that the fluoropolymer resin layer is not surface treated.

Pure THV-220G is extruded to layers using extrusion procedure #1 at 24 mil thickness. The roll of the (B) layer is then C-treated using the aforementioned process and stored with a release liner. After storage, the treated layer is found to be quite tacky and handling proved quite difficult due to excessive film blocking. The (B) layer is laminated to the glass substrates using the aforementioned techniques.

Optical measurements of the laminate showed a haze value of <2.0%. Boiling tests of the laminate caused bubbles to form in the film and edge delamination to occur over time.

EXAMPLE 2

THV-220G is extruded to layers using process #1 at 24 mil thickness. The layers are embossed in a secondary procedure, using a ribbed line pattern (150 lines per inch, 0.002" in depth), where the embossing roll is at a temperature of 232° F. The layer is collected on a non-siliconized release liner to inhibit blocking and stored. Prior to C-treatment, the release liner is stripped, and both sides of the layer are exposed to the aforementioned C-treatment conditions. The release liner is re-applied and the layer is laminated to the glass substrate. The (B) layer is less tacky and more handleable, than the non-embossed (B) layer of comparative Example 1, but still blocked to itself if placed in contact. Optical analysis of the laminates showed a haze <2.0%. Over time, however, optical defects in the form of haze lines (2.5–3.0%) developed. Boiling tests did not show evidence of bubble formation or edge delamination.

EXAMPLE 3

THV-220G is extruded to layers using process #3 at 24 mil thickness onto a matte casting roll (720 RA). The layer is collected on a non-siliconized release liner to inhibit blocking and stored. Prior to C-treatment, the release liner is stripped, and both sides of the layer are exposed to the aforementioned C-treatment conditions. The release liner is re-applied and the (B) layer is laminated to the glass substrate. The (B) layer is not tacky and proved to be easily handleable. Optical analysis of the laminates showed haze of 3.0–3.5%. In addition, boiling tests carried out on the laminates caused bubble formation between film and glass and edge delamination.

EXAMPLE 4

THV-220G is extruded to layers using process #3 at 24 mil thickness onto a matte casting roll (720 RA). The layers are then embossed in a secondary procedure, using a ribbed line pattern (150 lines per inch, 0.002" in depth), where the embossing roll is 232° F. The combined matted/lined layer is collected on a non-siliconized release liner to inhibit blocking and stored. Prior to C-treatment, the release liner is stripped, and both sides of the layers are exposed to the aforementioned C-treatment conditions. The release liner is re-applied and the layer is laminated to the glass substrate. The layer is quite handleable due to the matte surface. Optical analysis of the laminates showed the typical results of a Line pattern, low haze of <2.0% and an optical distortion line pattern which developed over time. Boiling tests of the laminates did not show evidence of bubbles or edge delamination developing over time.

EXAMPLE 5

THV-220G is extruded to layers using process #1 at 24 mil thickness. The layers are embossed in a secondary procedure, using an embossing roll having a "tank dull matte finish" over a ribbed line pattern (150 lines per inch, 0.002" in depth), where the embossing roll is 232° F. The embossing roll is obtained from International Engraving Company, Clifton N.J. The layer is collected on a non-siliconized release liner to inhibit blocking and stored. Prior to C-treatment, the release liner is stripped, and both sides of the layers are exposed to the aforementioned C-treatment conditions. The release liner is re-applied and the layer is laminated to the glass substrate. The (B) layer did not block to itself and proved to be very handleable. Optical analysis of the laminates showed a haze <2.0% with no evident optical distortion, bubbling or edge delamination over time.

What is claimed is:

1. A fire-protection and safety glazing laminate having a haze value less than 4 percent comprising:

(A) a plurality of high modulus layers laminated with (B) at least one fluoropolymer resin layer wherein (B) resides between (A), wherein the high modulus layers comprise glass, polycarbonate or polyurethane, provided that the high modulus layer has a Shore D hardness greater than about 70 when the high modulus layer comprises polyurethane, wherein the fluoropolymer resin layer is of a precursor resin web having a matte finish surface, an embossed finish surface or a combination thereof, said matte finish surface and embossed finish surface comprising projections having a height in the range of about 10 to 500 μm, wherein the fluoropolymer precursor resin web is exposed to a corona treatment in an organic gas atmosphere, and wherein the high modulus layers are adhered to the fluoropolymer resin layer through a pressure and heat lamination of the high modulus layers to the precursor resin web.

2. The laminate of claim 1 wherein the high modulus layer is glass.

3. The laminate of claim 1 wherein the fluoropolymer resin layer comprises at least one of FEP, PFA, ETFE, ECTFE, PCTFE, PVdF, THV, and blends and alloys thereof.

4. The laminate of claim 1 wherein the fluoropolymer resin layer comprises at least two of FEP, PFA, ETFE, ECTFE, PCTFE, PVdF, THV, and blends and alloys thereof.

5. The laminate of claim 3 wherein the fluoropolymer resin layer comprises THV.

6. The laminate of claim 1 wherein both sides of the fluoropolymer resin layer comprise a combination of a matte finish surface and an embossed finish surface.

7. The laminate of claim 1 wherein the organic atmosphere comprises acetone or an alcohol of four carbon atoms or less in nitrogen.

8. The laminate of claim 1 wherein the fluoropolymer resin layer is from 5 to 150 mils thick.

9. The laminate of claim 1 wherein present are two layers of (A) and one layer of (B) and wherein the (B) layer resides between the (A) layer.

10. The laminate of claim 1 wherein present are three layers of (A) and two layers of (B) and wherein each (B) layer resides between two (A) layers.

11. The laminate of claim 1 wherein present are two layers of (A) and two layers of (B) and wherein both (B) layers are adjacent to each other and reside between the (A) layers.

12. A fire-protection and safety glazing laminate having a haze value less than 4 percent comprising:

(A) a plurality of high modulus layers laminated with (B) at least one fluoropolymer resin layer wherein (B) resides between (A), wherein the high modulus layers comprise glass, polycarbonate or polyurethane, provided that the high modulus layer has a Shore D hardness greater than about 70 when the high modulus layer comprises polyurethane, wherein the fluoropolymer resin layer is of a precursor resin web having a matte finish surface, an embossed finish surface or a combination thereof, said matte finish and embossed finish comprising projection having a height in the range of about 10 to 500 μm, wherein the fluoropolymer precursor resin web is exposed to a corona treatment in an organic gas atmosphere, wherein the high modulus layers are adhered to the fluoropolymer resin layer through a pressure and heat lamination of the high modulus layers to the precursor resin web, and wherein the laminate is free of any adhesive layer between each adjacent layer (A) and layer (B).

* * * * *

UNITED STATES PATENT AND TRADEMARK OFFICE
CERTIFICATE OF CORRECTION

PATENT NO. : 6,726,979 B2 Page 1 of 1
APPLICATION NO. : 10/083437
DATED : April 27, 2004
INVENTOR(S) : Michael L. Friedman et al.

It is certified that error appears in the above-identified patent and that said Letters Patent is hereby corrected as shown below:

Column 15
Line 52, delete " THY " and substitute -- THV -- therefor.

Signed and Sealed this

Fifth Day of February, 2008

JON W. DUDAS
*Director of the United States Patent and Trademark Office*